US 11,709,953 B2

(12) United States Patent
Kulaga et al.

(10) Patent No.: US 11,709,953 B2
(45) Date of Patent: Jul. 25, 2023

(54) SYSTEMS AND METHODS FOR EXECUTING DATA PROTECTION POLICIES SPECIFIC TO A CLASSIFIED ORGANIZATIONAL STRUCTURE

(71) Applicant: Acronis International GmbH, Schaffhausen (CH)

(72) Inventors: Andrey Kulaga, Moscow (RU); Stanislav Protasov, Singapore (SG); Serguei Beloussov, Costa del Sol (SG); Nikolay Grebennikov, Sofia (BG)

(73) Assignee: Acronis International GmbH, Schaffhausen (CH)

( * ) Notice: Subject to any disclaimer, the term of this patent is extended or adjusted under 35 U.S.C. 154(b) by 179 days.

(21) Appl. No.: 17/201,101

(22) Filed: Mar. 15, 2021

(65) Prior Publication Data
US 2021/0397726 A1 Dec. 23, 2021

Related U.S. Application Data

(60) Provisional application No. 63/041,432, filed on Jun. 19, 2020.

(51) Int. Cl.
*G06F 21/62* (2013.01)
*G06F 16/28* (2019.01)
(Continued)

(52) U.S. Cl.
CPC .............. *G06F 21/62* (2013.01); *G06F 16/13* (2019.01); *G06F 16/285* (2019.01); *G06F 21/64* (2013.01);
(Continued)

(58) Field of Classification Search
CPC ........ G06F 21/62; G06F 16/13; G06F 16/285; G06F 21/64; G06F 16/906;
(Continued)

(56) References Cited

U.S. PATENT DOCUMENTS

2011/0258258 A1* 10/2011 Briere ................. G06F 16/9535
709/205
2013/0132389 A1* 5/2013 Majidian ................. G06F 16/93
707/736

(Continued)

FOREIGN PATENT DOCUMENTS

WO 2019075399 A1 4/2019

*Primary Examiner* — J. Brant Murphy
(74) *Attorney, Agent, or Firm* — ArentFox Schiff LLP; Michael Fainberg

(57) ABSTRACT

Disclosed herein are systems and methods for classifying organizational structure for implementing data protection policies. In one exemplary aspect, a method may comprise retrieving a plurality of data files of an organization, wherein the plurality of data files are stored in a data storage; retrieving structural information of the organization, the structural information comprising details of user accounts, organizational roles, and file metadata within the organization; classifying the structural information into an organization type of a plurality of organization types; classifying each respective data file of the plurality of data files into a respective topic of a plurality of topics, wherein the plurality of topics are associated with the organization type; generating a data protection policy for the organization based on each respective topic of the plurality of data files and the organization type; and executing the data protection policy on the data storage.

20 Claims, 5 Drawing Sheets

(51) Int. Cl.
  *G06F 16/13* (2019.01)
  *H04L 9/40* (2022.01)
  *G06F 21/64* (2013.01)
(52) U.S. Cl.
  CPC .......... *H04L 63/102* (2013.01); *H04L 63/104* (2013.01); *H04L 63/105* (2013.01)
(58) Field of Classification Search
  CPC . G06F 21/6209; H04L 63/102; H04L 63/104; H04L 63/105; H04L 63/1425; H04L 63/145; H04L 63/20
  See application file for complete search history.

(56) References Cited

U.S. PATENT DOCUMENTS

| | | | |
|---|---|---|---|
| 2015/0347765 A1* | 12/2015 | Hankins, Jr. | H04L 63/20 726/26 |
| 2016/0171208 A1* | 6/2016 | Matthiesen | H04L 63/102 726/6 |
| 2016/0261616 A1* | 9/2016 | Shulman | H04L 63/10 |
| 2016/0328574 A1* | 11/2016 | Lim | G06F 21/6218 |
| 2019/0065626 A1* | 2/2019 | Cameron | G06F 16/90335 |
| 2020/0026804 A1* | 1/2020 | Garg | G06F 16/332 |
| 2021/0117561 A1* | 4/2021 | Carroll, Jr. | G06F 9/5072 |
| 2021/0248247 A1* | 8/2021 | Poothokaran | G06F 16/35 |
| 2022/0293107 A1* | 9/2022 | Leaman | G06Q 30/0246 |
| 2022/0343250 A1* | 10/2022 | Tremblay | G06Q 10/06316 |
| 2022/0366494 A1* | 11/2022 | Celia | G06N 20/20 |

* cited by examiner

SYSTEMS AND METHODS FOR EXECUTING DATA PROTECTION POLICIES SPECIFIC TO A CLASSIFIED ORGANIZATIONAL STRUCTURE

CROSS-REFERENCE TO RELATED APPLICATIONS

This application claims the benefit of U.S. Provisional Application No. 63/041,432, filed Jun. 19, 2020, which is herein incorporated by reference.

FIELD OF TECHNOLOGY

The present disclosure relates to the field of data storage and security, and, more specifically, to systems and methods for executing data protection policies specific to a classified organizational structure.

BACKGROUND

Organizations, such as companies, universities, etc., often host sensitive data on third party storage (e.g., cloud environments) and need to protect their potentially valuable information. Depending on where the data is stored, a one-size-fits-all approach is often used to implement privacy settings. For example, data of a particular organization may be encrypted using a public key and decrypted by a private key of the organization. The stored data may be periodically scanned for malware/viruses as well.

However, each type of organization has its own needs for data protection, and therefore the one-size-fits-all approach is ineffective. For example, data associated with a nation's military or political information requires a different level of protection than data associated with a movies on a media streaming application. In order to determine an ideal data protection policy for a particular organization, however, a robust classification system is needed. Defining an organization's type and structure serves as the foundation for enhanced data protection policy implementation.

SUMMARY

To address these shortcomings, aspects of the disclosure describe methods and systems for executing data protection policies specific to a classified organizational structure.

In one exemplary aspect, a method may comprise retrieving a plurality of data files of an organization, wherein the plurality of data files are stored in a data storage; retrieving structural information of the organization, the structural information comprising details of user accounts, organizational roles, and file metadata within the organization; classifying the structural information into an organization type of a plurality of organization types; classifying each respective data file of the plurality of data files into a respective topic of a plurality of topics, wherein the plurality of topics are associated with the organization type; generating and executing a data protection policy specific to the organization based on each respective topic of the plurality of data files and the organization type; monitoring for a violation of the data protection policy; and in response to detecting the violation of the data protection policy, transmitting a security alert to an administrator of the organization.

In some aspects, the method may comprise identifying a plurality of organizational roles within the organization based on the structural information; determining whether the respective data file is shared by at least two organizational roles of the plurality of organizational roles; and in response to determining that the respective data file is shared by the at least two organizational roles, grouping the at least two organizational roles in a security group.

In some aspects, determining whether the respective data file is shared by the at least two organizational roles comprises determining that the respective data file is in a directory that is accessible by users associated with the at least two organizational roles.

In some aspects, the data protection policy comprises a plurality of permission profiles, and wherein the security group is assigned a permission profile of the plurality of permission profiles that is unique to the security group.

In some aspects, the data protection policy comprises a plurality of policies, and wherein each respective data file is assigned a respective policy of the plurality of policies.

In some aspects, detecting the violation comprises detecting malware that is attempting access to a file in the plurality of files, and the method may comprise removing the malware.

In some aspects, the method may comprise classifying each respective data file of the plurality of data files into a respective sub-topic of a plurality of sub-topics, wherein the plurality of sub-topics are associated with a given topic; and generating the data protection policy for the organization based on each respective sub-topic of the plurality of data files and the organization type.

In some aspects, the method may comprise generating the plurality of sub-topics for the given topic by analyzing, using natural language processing, a subset of the plurality of data files classified under the given topic to detect key terms, wherein a detected key term is identified as a sub-topic.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of classifying organizational structure for implementing data protection policies. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
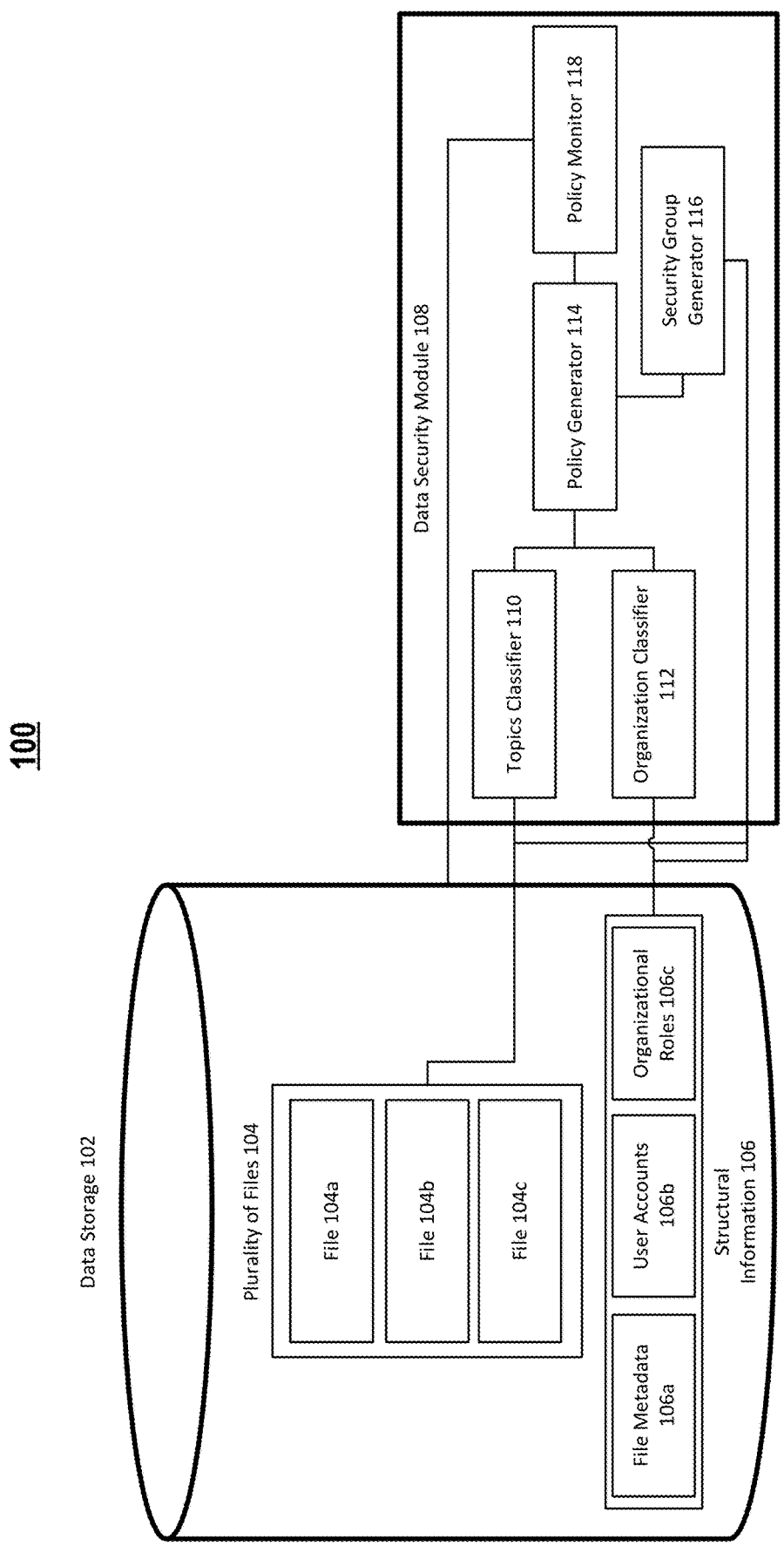
FIG. 1 is a block diagram illustrating a system of executing data protection policies specific to a classified organizational structure.

FIG. 1 is a block diagram illustrating system 100 of executing data protection policies specific to a classified organizational structure, in accordance with aspects of the present disclosure. System 100 comprises data storage 102 and data security module 108. Both entities may be a part of computer system 20, which will be described in FIG. 5. In some aspects, the entities may be on separate computer systems 20. For example, data storage 102 may be on a remote server and data security module 108 may be on a different server.

Data storage 102 may specifically store an organization's information including a plurality of files 104 (used interchangeably with a plurality of data files 104). Plurality of data files 104 includes, for simplicity, only files 104a, 104b, and 104c. One skilled in the art will appreciate, however, that plurality of files 104 may comprise several more files. Data storage 102 may also include structural information 106, which includes file metadata 106a, user accounts 106b, and organizational roles 106c.

Data security module 108 may be a part of an anti-virus software. Components of data security module 108 include topics classifier 110, organization classifier 112, policy generator 114, policy monitor 118, and security group generator 116. In exemplary aspects, data security module 108 is configured to classify organizational structure for implementing data protection policies. Data security module 108 may first retrieve a plurality of data files 104 of an organization, wherein the plurality of data files are stored in data storage 102. In some aspects, these data files include documents, applications, media, and various other files that are generated/accessed by authorized users (e.g., employees) of the organization.

In some aspects, data security module 108 may collect URLs of organizations in a database (e.g., a SQLite database) and then perform data discovery using a data miner (e.g., a web crawler). For example, certain websites may hold content such as HTML files, PDF files, text files, media files, etc. Pages may be fetched by the data miner using an API. For example, a web crawling library in GoLang may be used by data security module 108 to save all pages and documents on a website. The data mining can be configured to limit the amount of data files that are retrieved by targeting certain file extensions, indicating a maximum file size, indicating a maximum amount of files to retrieve, determining an amount of parallel workers (for pulling files) and indicating a work time, delay, and timeout related to how long to perform the data mining. The files collected by data security module 108 using data mining may be a part of plurality of files 104.

Additionally, data security module 108 retrieves structural information of the organization. The structural information comprises details of user accounts, organizational roles, and file metadata within the organization. For example, the organization may be a company that provides each of its employees with computers with their own unique login username and password. The details of the user accounts 106b may list an employee's name, their position in the organization, the configuration of the computer system he/she uses, etc. The organizational roles may indicate the hierarchy of employment. For example, an employee may be on a specific team (e.g., marketing) within the organization. In this case, the name of the team or a job title represents the organizational role 106c. File metadata 106a within the organization indicate details about the files 104 such as size, creation date, modification date, file type, etc.

Organization classifier 112 gathers structural information 106 and classifies the information into an organization type of a plurality of organization types. In an example, the plurality of organization types may include, but are not limited to, the following:

| | |
|---|---|
| Commodity Chemicals | Integrated Mining |
| Agriculture Chemicals | Auto & Truck Manufacturers |
| Specialty Chemicals | Hotels & Entertainment Services |
| Diversified Chemicals | Advertising & Marketing |
| Financial & Commodity Market Operators | Department Stores |
| Precious Metals & Minerals | Water & Other Utilities |
| Gold | Electric Utilities |
| Steel | Banks |

In an exemplary aspect, organization classifier 112 may be trained using a dataset that includes structural information for several pre-classified organizations. The dataset may be a data structure comprising a plurality of vectors. Each vector may include an input comprising the structural information. The structural information may indicate certain file metadata (e.g., file extensions), different types of employees, the teams within a particular company. Each vector may also include an output that indicates the organization type associated with the input structural information. The dataset may be split to first train organization classifier 112 and then test the trained organization classifier 112 on a different portion of the dataset. Organization classifier 112 may be trained using various machine learning techniques such as a Naïve Bayes, a linear classifier, a support vector machine, a random forest, and an artificial neural network.

When organization classifier 112 is successfully trained (e.g., the percentage of error in classifying an organization into an organization type is reduced to below a threshold percentage), organization classifier 112 can be used to classify any input structural information outside of the dataset used for training purposes. It should be noted that each organization type has a plurality of topics associated with them. For example, "bank" may be associated with topics such as "bankruptcy," "loans," "cash," "deposit," "withdrawal," etc. Likewise, the organization type of "gold" may be associated with topics such as "mining," "currency," "cash," "jewelry," etc. Certain topics may be shared amongst multiple organization types.

Topics classifier 110 gathers files 104 and classifies each respective data file of the plurality of data files into a respective topic of a plurality of topics associated with the classified organization type. Topics classifier 110 may also be a machine learning model that is trained using a dataset comprising file metadata from at least one organization of a particular organization type and pre-classified topics. For example, the organization type of "bank" may umbrella multiple banks such as Chase, Citi, TD, etc. Each bank may have sample files that have been collected by, for example, a web crawler. A dataset may be generated that includes information about each file and a topic. For example, a file may include policies about an account. The dataset may include an extension of the file, text from the file, a file size, etc., as data points in an input vector. The output for this particular input vector may be a topic such as "policy." Topics classifier 110 may also be trained using various machine learning techniques such as a Naïve Bayes, a linear classifier, a support vector machine, a random forest, and an artificial neural network.

It should be noted that classifying topics based on the organization type is important because files can be misclassified when considered in a vacuum. Suppose that only a plurality of topics are considered for classifying the files. A document comprising code with comments about a smart contract implementation in blockchain technology may be misclassified as a "contractual" topic associated with banks. In reality, the document should be classified as "source code" of a software company. Accordingly, topics classifier 110 may select an appropriate machine learning model that is trained to classify the plurality of topics specific to a certain organization type.

Subsequent to the classifications made by topics classifier 110 and organization classifier 112, policy generator 114 may generate a data protection policy for the organization based on each respective topic of the plurality of data files and the organization type. Each topic under an organization type may be associated with various policies. These policies may dictate who, when, and how a file may be accessed. A policy may also dictate how often the file is checked for data integrity and malicious behavior. In some aspects, a policy may dictate whether copies of the file can be made. A data protection policy that is generated by policy generator 114 comprises a configuration indicating these criteria. For example, if the topic is "source code," the data protection policy may only allow access to software developers, may allow copying of the code to a limited number of directories, may check the copy for data integrity X times per week, may be inaccessible on weekends, etc.

Policy monitor 118 may subsequently execute the data protection policy on the data storage 102. In some aspects, the data protection policy comprises a plurality of policies, and wherein each respective data file is assigned a respective policy of the plurality of policies. In some aspects, policy monitor 118 may monitor for a violation of the data protection policy, and in response to detecting the violation of the data protection policy, may issue and transmit a security alert (e.g., to an administrator of data storage 102) detailing information about the violation such as timestamp, entities involved, device ID, file ID, etc. For example, a violation may be an unauthorized entity gaining access to a file. In some cases, this may be malware and module 108 may remove the malware. In some cases, the unauthorized member may be someone from a certain job title that is attempting to access classified information. In some aspects, a policy starts working in audit mode to check required modifications. When everything works as required, the policy starts working in enforcement mode.

In some aspects, security group generator 116 may identify a plurality of organizational roles within the organization based on the structural information. Organizational roles may include, but are not limited to, the following:

| | |
|---|---|
| Audit | Manufacturing |
| Finance | Marketing |
| IT | Operations |
| Law | Research |
| Management | HR |

It should be noted that depending on the organization type, there may be more, fewer, or different roles than the ones shown above. Security group generator 116 may determine whether the respective data file is shared by at least two organizational roles of the plurality of organizational roles. For example, a specifications sheet about a product may be shared by a member of IT and a member of Research. In response to determining that the respective data file is shared by the at least two organizational roles (e.g., the file is in a directory accessible by users associated with the two roles), security group generator 116 may group the at least two organizational roles in a security group. For example, security group generator 116 may generate, with a unique ID, a hybrid security group comprising IT and research. A security group represents a single entity in which all members have the same permissions (under a data protection policy) to the file. In some aspects, security groups may be discovered from an Active Directory.

Creating security groups allows for easier monitoring of the data protection policy because policy monitor 118 does not have to determine whether a policy has been violated by assessing several credentials of different employees. Instead, policy monitor 118 may simply query the security group of the user attempting to access a file. For example, if someone in auditing or finance attempts to alter the specifications sheet mentioned above, policy monitor 118 may determine that the person is not in the proper security group and raises an alert indicating improper access. Suppose that the organization is a software company. While a human resources (HR) employee may be able to access benefits and salary information about an employee that is an engineer, for example, the engineer may not have access to this information. Likewise, the engineer may have access to programming files that the HR employee would not have access to.

In some aspects, the data protection policy may comprise a plurality of permission profiles, and the security group may be assigned a permission profile of the plurality of permission profiles that is unique to the security group. The permissions profile may indicate which files of the plurality of files that a security group can access, when they can access the file, how often, whether they can copy/modify/delete the file, etc.

Figure 2:
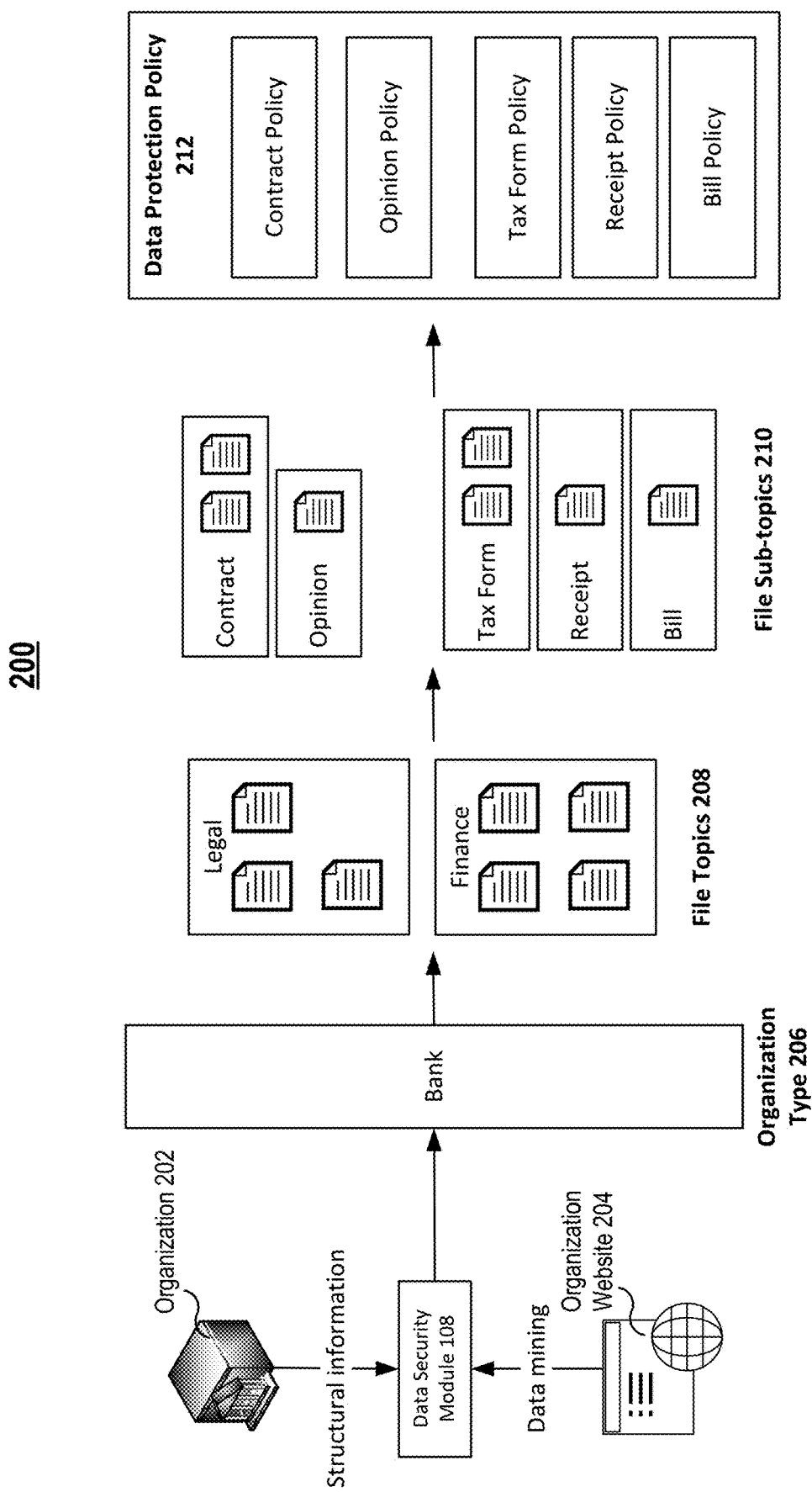
FIG. 2 is a block diagram illustrating an example of classifying organizational structure of an organization.

FIG. 2 is a block diagram illustrating example 200 of classifying organizational structure of an organization. In example 200, organization 202 may be a bank. Data security module 108 may extract structural information from organization 202 and may also perform data mining on organization website 204 of organization 202. Based on the data acquired, security module 108 may determine that the organization type 206 of organization 202 is "bank." For simplicity, suppose that the file topics associated with organization type 206 is "legal" and "finance."

Security module 108 may utilize another classifier to determine whether a particular file is a legal file or a finance file. In some aspects, subsequent to classifying a topic of a file, security module 108 may determine a sub-topic of the file. In this case, security module 108 may use a pre-trained classifier for each topic (e.g., a machine learning algorithm for sub-classifying the legal topic and a different machine learning algorithm for sub-classifying the finance topic). Suppose for simplicity that the sub-topics of the legal topic are only "contract" and "opinion." Furthermore, suppose that the sub-topics of the finance topic are only "tax form," "receipt," and "bill." For each file of organization 202, data security module 108 may determine a sub-topic from these sub-topics. As the files are already classified by topic, this creates a robust classification of what the file actually includes. For example, the topic of "legal" may include a variety of legal documents with ranging importance, data sensitivity, etc. Simply classifying a file as "legal," may not effectively capture these attributes. On the other hand, a sub-topic such as "contract," further establishes deeper understanding of the file.

In some aspects, the topics and sub-topics can be made as general or specific as desired. Data security module 108 may also determine the sub-topics and/or topics specificity based on information found in a file. For example, if multiple documents use a keyword such as "Organization v. Opposition Lawsuit," data security module 108 may use this term as a sub-topic under the "legal" topic. More specifically, if a term or phrase is used in at least a threshold number of files classified under a topic, data security module 108 may set the term or phrase as a sub-topic by using keyword extraction techniques in natural language processing.

As shown in example 200, data security module 108 generates a plurality of policies in data protection policy 212. These policies include contract policy, opinion policy, tax form policy, receipt policy, and bill policy.

Figure 3:
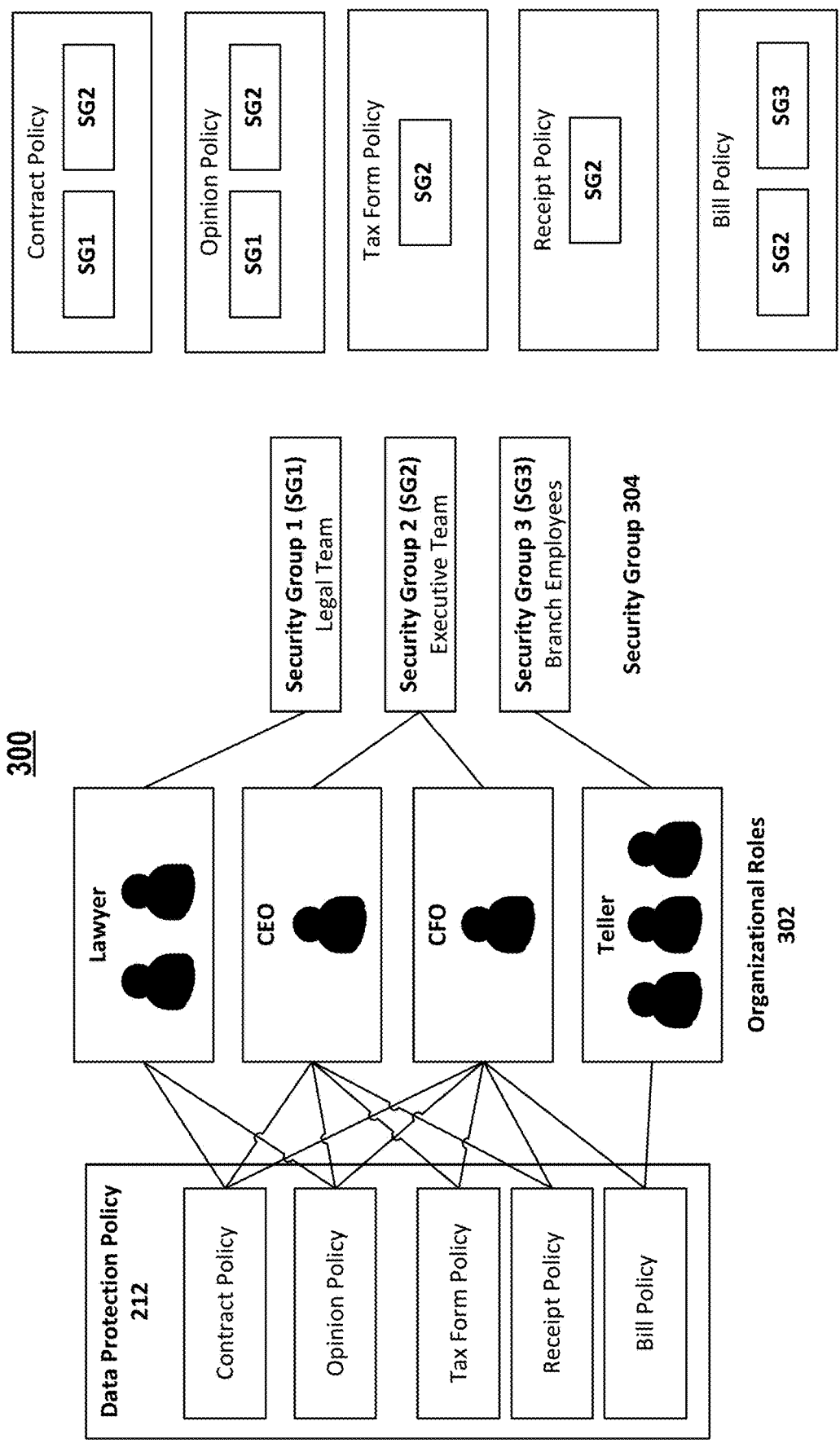
FIG. 3 is a block diagram illustrating an example of generating security groups for various organizational roles.

FIG. 3 is a block diagram illustrating example 300 of generating security groups for various organizational roles. Example 300 continues from example 200. Suppose that organization 200 has several employees. Each employee may have an organizational role (e.g., a job type/title). In example 300, for simplicity, only four organizational roles 302 are shown: lawyer, CEO, CFO, and teller. Based on the topics and/or sub-topic classes, data security module 108 may establish an initial allocation of access rights. For example, a lawyer may have access to various contract and opinion letters. A CEO and a CFO may have access to all files belonging to organization 202. A teller may access to bills generated for customers. Because the CEO and CFO of organization 202 have access to all files (i.e., they share a set of files), data security module 108 may generate a security group specific to those two organizational roles (e.g., security group 2—executive team). On the other hand, lawyers are part of security group 1 and tellers are part of security group 3. The data protection policy 212 thus includes policies for a plurality of files belonging to specific sub-topics. For each sub-topic, there are different security groups that have access credentials.

In some aspects, each security group may have different access rights to a file. For example, in the opinion policy, the legal team and the executive team both have access rights. However, by default, the executive team may only have read-only rights and the legal team may have both read and write access (because lawyers write opinion lawyers). The policy may also specify the amount of times a specific group can access a given file in the policy, when the file can be accessed (e.g., an executive team may not get access until an opinion letter file is published while the legal team may have access during the drafting stage), the type of encryption used for such files, the amount of times and/or periodicity of the files checked for malware and hacking (e.g., tax forms may have more secure encryption than bills and may be more frequently scanned), file redundancy (e.g., the amount of copies of the file to maintain and where), backup settings, etc. Information and policy attributes specific to a security group are stored in a permission profile of the security group.

Figure 4:
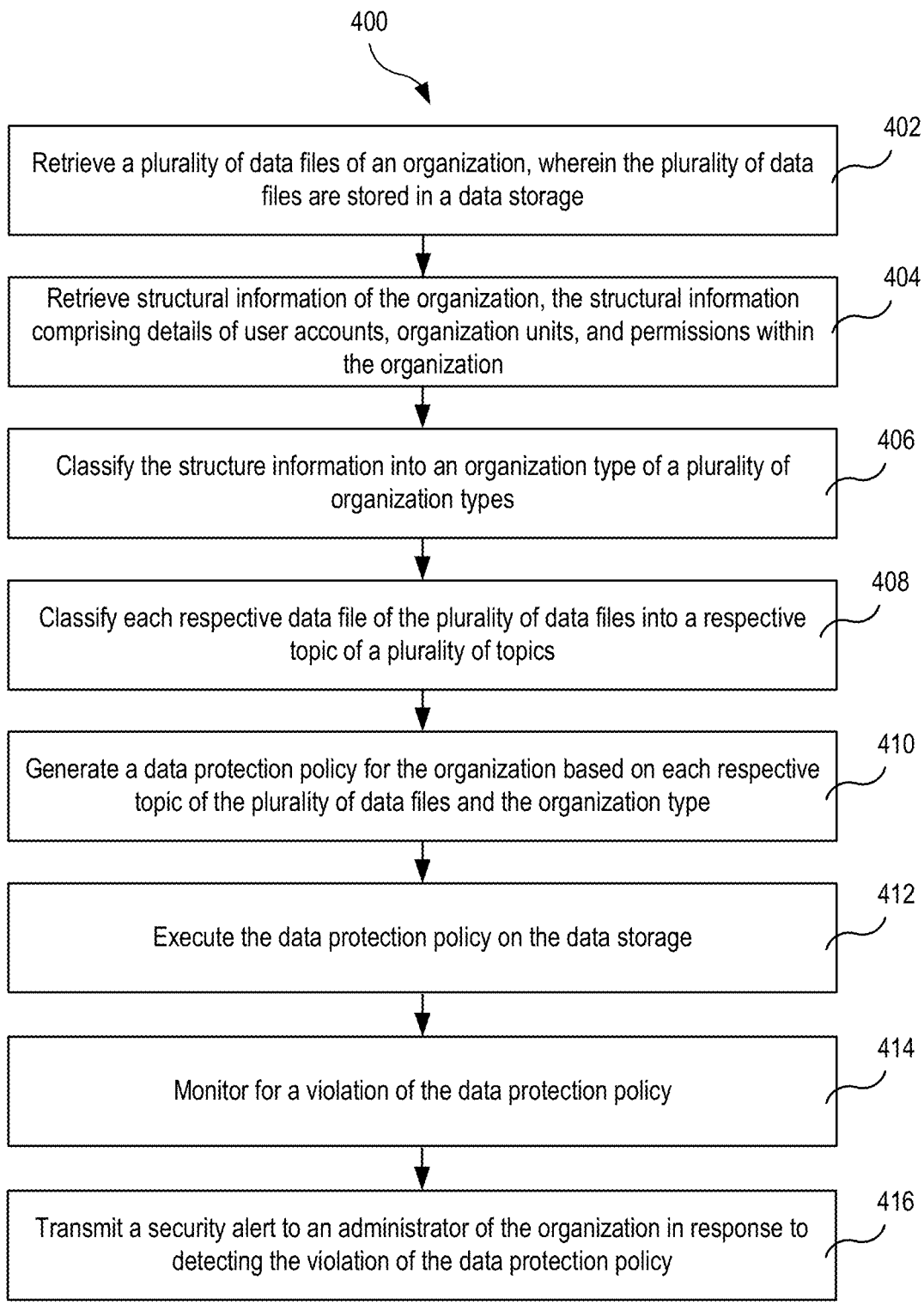
FIG. 4 illustrates a flow diagram of a method of executing data protection policies specific to a classified organizational structure.

FIG. 4 illustrates a flow diagram of method 400 of executing data protection policies specific to a classified organizational structure, in accordance with aspects of the present disclosure. At 402, data security module 108 retrieves a plurality of data files of an organization, wherein the plurality of data files are stored in a data storage. At 404, data security module 108 retrieves structural information of the organization, the structural information comprising details of user accounts, organizational roles, and permissions within the organization. At 406, organization classifier 112 classifies the structure information into an organization type of a plurality of organization types. At 408, topics classifier 110 classifies each respective data file of the plurality of data files into a respective topic of a plurality of topics. At 410, policy generator 114 generates a data protection policy for the organization based on each respective topic of the plurality of data files and the organization type. At 412, data security module 108 executes the data protection policy on the data storage. At 414, data security module 108 monitors for a violation of the data protection policy. At 416, data security module 108 transmits a security alert to an administrator of the organization in response to detecting the violation of the data protection policy.

Figure 5:
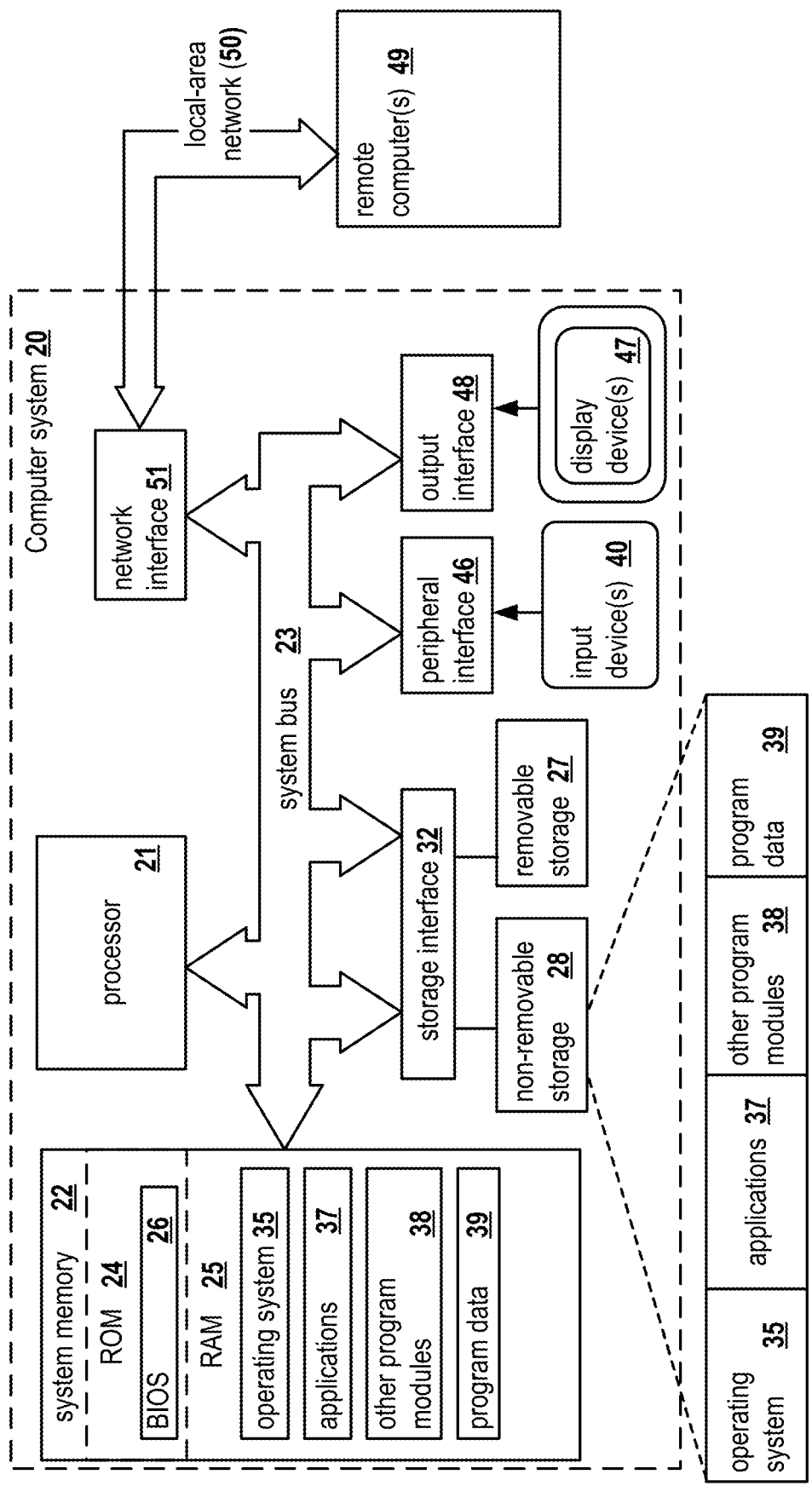
FIG. 5 presents an example of a general-purpose computer system on which aspects of the present disclosure can be implemented.

FIG. 5 is a block diagram illustrating a computer system 20 on which aspects of systems and methods of classifying organizational structure for implementing data protection policies may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for executing data protection policies specific to a classified organizational structure, the method comprising:
    retrieving a plurality of data files of an organization, wherein the plurality of data files are stored in a data storage;
    retrieving structural information of the organization, the structural information comprising details of user accounts, organizational roles, and file metadata within the organization;
    classifying the structural information into an organization type of a plurality of organization types;
    classifying each respective data file of the plurality of data files into a respective topic of a plurality of topics, wherein the plurality of topics are associated with the organization type;
    generating and executing a data protection policy specific to the organization based on each respective topic of the plurality of data files and the organization type;
    monitoring for a violation of the data protection policy; and
    in response to detecting the violation of the data protection policy, transmitting a security alert to an administrator of the organization.

2. The method of claim 1, further comprising:
    identifying a plurality of organizational roles within the organization based on the structural information;
    determining whether the respective data file is shared by at least two organizational roles of the plurality of organizational roles; and
    in response to determining that the respective data file is shared by the at least two organizational roles, grouping the at least two organizational roles in a security group.

3. The method of claim 2, wherein determining whether the respective data file is shared by the at least two organizational roles comprises determining that the respective data file is in a directory that is accessible by users associated with the at least two organizational roles.

4. The method of claim 2, wherein the data protection policy comprises a plurality of permission profiles, and wherein the security group is assigned a permission profile of the plurality of permission profiles that is unique to the security group.

5. The method of claim 1, wherein the data protection policy comprises a plurality of policies, and wherein each respective data file is assigned a respective policy of the plurality of policies.

6. The method of claim 1, wherein detecting the violation comprises detecting malware that is attempting access to a file in the plurality of files, further comprising removing the malware.

7. The method of claim 1, further comprising:
    classifying each respective data file of the plurality of data files into a respective sub-topic of a plurality of sub-topics, wherein the plurality of sub-topics are associated with a given topic; and
    generating the data protection policy for the organization based on each respective sub-topic of the plurality of data files and the organization type.

8. The method of claim 7, further comprising:
    generating the plurality of sub-topics for the given topic by analyzing, using natural language processing, a subset of the plurality of data files classified under the given topic to detect key terms, wherein a detected key term is identified as a sub-topic.

9. A system for executing data protection policies specific to a classified organizational structure, the system comprising:
    a hardware processor configured to:
        retrieve a plurality of data files of an organization, wherein the plurality of data files are stored in a data storage;
        retrieve structural information of the organization, the structural information comprising details of user accounts, organizational roles, and file metadata within the organization;
        classify the structural information into an organization type of a plurality of organization types;
        classify each respective data file of the plurality of data files into a respective topic of a plurality of topics, wherein the plurality of topics are associated with the organization type;
        generate and execute a data protection policy specific to the organization based on each respective topic of the plurality of data files and the organization type;
        monitor for a violation of the data protection policy; and
        in response to detecting the violation of the data protection policy, transmit a security alert to an administrator of the organization.

10. The system of claim 9, wherein the hardware processor is further configured to:
    identify a plurality of organizational roles within the organization based on the structural information;

determine whether the respective data file is shared by at least two organizational roles of the plurality of organizational roles; and in response to determining that the respective data file is shared by the at least two organizational roles, group the at least two organizational roles in a security group.

11. The system of claim 10, wherein the hardware processor is further configured to determine whether the respective data file is shared by the at least two organizational roles by determining that the respective data file is in a directory that is accessible by users associated with the at least two organizational roles.

12. The system of claim 10, wherein the data protection policy comprises a plurality of permission profiles, and wherein the security group is assigned a permission profile of the plurality of permission profiles that is unique to the security group.

13. The system of claim 9, wherein the data protection policy comprises a plurality of policies, and wherein each respective data file is assigned a respective policy of the plurality of policies.

14. The system of claim 9, wherein detecting the violation comprises detecting malware that is attempting access to a file in the plurality of files, and wherein the hardware processor is further configured to remove the malware.

15. The system of claim 9, wherein the hardware processor is further configured to:

classify each respective data file of the plurality of data files into a respective sub-topic of a plurality of sub-topics, wherein the plurality of sub-topics are associated with a given topic; and generate the data protection policy for the organization based on each respective sub-topic of the plurality of data files and the organization type.

16. The system of claim 15, wherein the hardware processor is further configured to:

generate the plurality of sub-topics for the given topic by analyzing, using natural language processing, a subset of the plurality of data files classified under the given topic to detect key terms, wherein a detected key term is identified as a sub-topic.

17. A non-transitory computer readable medium storing thereon computer executable instructions for executing data protection policies specific to a classified organizational structure, including instructions for:

retrieving a plurality of data files of an organization, wherein the plurality of data files are stored in a data storage;

retrieving structural information of the organization, the structural information comprising details of user accounts, organizational roles, and file metadata within the organization;

classifying the structural information into an organization type of a plurality of organization types;

classifying each respective data file of the plurality of data files into a respective topic of a plurality of topics, wherein the plurality of topics are associated with the organization type;

generating and executing a data protection policy specific to the organization based on each respective topic of the plurality of data files and the organization type;

monitoring for a violation of the data protection policy; and in response to detecting the violation of the data protection policy, transmitting a security alert to an administrator of the organization.

18. The non-transitory computer readable medium of claim 17, further comprising instructions for:

identifying a plurality of organizational roles within the organization based on the structural information;

determining whether the respective data file is shared by at least two organizational roles of the plurality of organizational roles; and in response to determining that the respective data file is shared by the at least two organizational roles, grouping the at least two organizational roles in a security group.

19. The non-transitory computer readable medium of claim 18, wherein instructions for determining whether the respective data file is shared by the at least two organizational roles comprises instructions for determining that the respective data file is in a directory that is accessible by users associated with the at least two organizational roles.

20. The non-transitory computer readable medium of claim 18, wherein the data protection policy comprises a plurality of permission profiles, and wherein the security group is assigned a permission profile of the plurality of permission profiles that is unique to the security group.

* * * * *